US 9,719,876 B2

(12) United States Patent
Reverdy et al.

(10) Patent No.: US 9,719,876 B2
(45) Date of Patent: Aug. 1, 2017

(54) FLUID PRESSURE SENSOR

(71) Applicant: Commissariat A L'Energie Atomique et aux Energies Alternatives, Paris (FR)

(72) Inventors: Jacques Reverdy, Crolles (FR); Thierry Thomas, Varces Allieres et Risset (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 115 days.

(21) Appl. No.: 14/828,680

(22) Filed: Aug. 18, 2015

(65) Prior Publication Data
US 2016/0061678 A1 Mar. 3, 2016

(30) Foreign Application Priority Data

Aug. 26, 2014 (FR) ..................... 14 58002

(51) Int. Cl.
*G01L 9/10* (2006.01)
*G01L 9/00* (2006.01)
*H01F 41/04* (2006.01)

(52) U.S. Cl.
CPC ............ *G01L 9/007* (2013.01); *G01L 9/0029* (2013.01); *H01F 41/04* (2013.01)

(58) Field of Classification Search
CPC ... G01L 9/10; G01L 9/00; G01L 9/007; G01L 9/0029; H01F 41/04
See application file for complete search history.

(56) References Cited

U.S. PATENT DOCUMENTS

| | | | |
|---|---|---|---|
| 3,731,184 | A | 5/1973 | Goldberg et al. |
| 4,085,394 | A | 4/1978 | Weisenburger |
| 4,206,761 | A | 6/1980 | Cosman |
| 4,233,523 | A | 11/1980 | Jarder et al. |
| 4,334,428 | A | 6/1982 | Fima et al. |
| 4,494,411 | A | 1/1985 | Koschke et al. |
| 4,593,703 | A | 6/1986 | Cosman |

(Continued)

FOREIGN PATENT DOCUMENTS

| | | |
|---|---|---|
| DE | 10 2005 016 812 B3 | 12/2006 |
| DE | 102005016812 B3 * | 12/2006 ............. A61B 5/031 |

(Continued)

OTHER PUBLICATIONS

Preliminary Search Report issued May 12, 2015 in French Patent Application No. FR 1458002.

*Primary Examiner* — Nguyen Ha
*Assistant Examiner* — Wyn Ha
(74) *Attorney, Agent, or Firm* — Oblon, McClelland, Maier & Neustadt, L.L.P.

(57) ABSTRACT

This fluid pressure sensor includes a coil the self inductance of which varies as a function of the pressure of a fluid inside the flexible pipe. This coil includes a turn including:
a first portion and a second portion of its periphery rigidly mechanically connected to a first location and a second location on the periphery of the pipe, respectively, and third and fourth free portions of the periphery of the turn situated between the first and second portions and each on a respective side of a central axis of the pipe and each separated from the flexible pipe by a clearance.

12 Claims, 4 Drawing Sheets

(56) References Cited

U.S. PATENT DOCUMENTS

| | | | |
|---|---|---|---|
| 4,665,753 A | | 5/1987 | Bertrand |
| 4,976,151 A | * | 12/1990 | Morishita ............. G01L 9/0004 |
| | | | 336/30 |
| 5,610,340 A | | 3/1997 | Carr et al. |
| 5,636,547 A | | 6/1997 | Raj et al. |
| 6,287,256 B1 | | 9/2001 | Park et al. |
| 6,939,299 B1 | | 9/2005 | Petersen et al. |
| 7,146,861 B1 | | 12/2006 | Cook et al. |
| 7,181,975 B1 | | 2/2007 | Bradley et al. |
| 2003/0230145 A1 | | 12/2003 | Pinto et al. |
| 2004/0193058 A1 | | 9/2004 | Montegrande et al. |
| 2008/0058632 A1 | | 3/2008 | Tai et al. |
| 2013/0046166 A1 | | 2/2013 | Maleki Jafarabadi et al. |
| 2013/0098170 A1 | | 4/2013 | Lee et al. |
| 2016/0206794 A1 | * | 7/2016 | Makower ................ A61M 1/06 |

FOREIGN PATENT DOCUMENTS

| | | | |
|---|---|---|---|
| FR | 2 555 743 A1 | 5/1985 | |
| GB | 1 382 706 | 2/1975 | |
| GB | 1436313 A * | 5/1976 | ............. G01L 7/022 |
| JP | 3-131733 | 6/1991 | |
| JP | 2006208056 A * | 8/2006 | ............... G01L 9/10 |
| WO | WO 99/56614 A1 | 11/1999 | |
| WO | WO 01/11328 A1 | 2/2001 | |
| WO | WO 02/15774 A1 | 2/2002 | |
| WO | WO 03/106952 A2 | 12/2003 | |
| WO | WO 2005/077262 A1 | 8/2005 | |
| WO | WO 2006/062275 A1 | 6/2006 | |

* cited by examiner

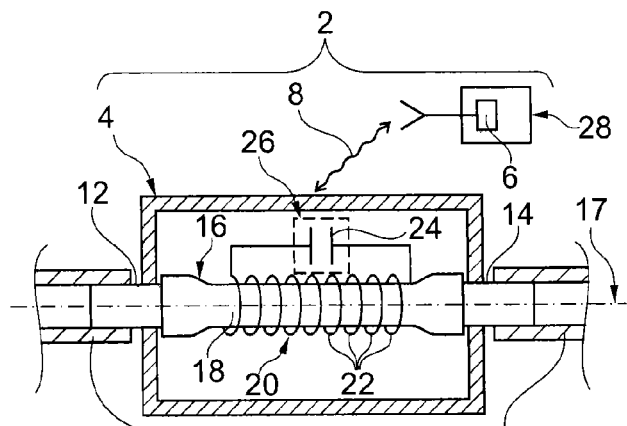
Fig. 1
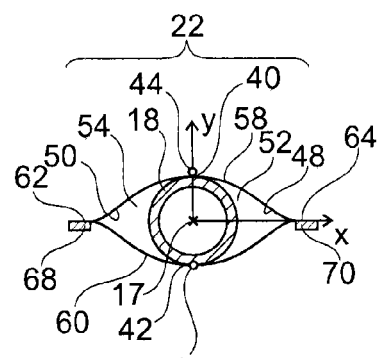
Fig. 2
Fig. 3
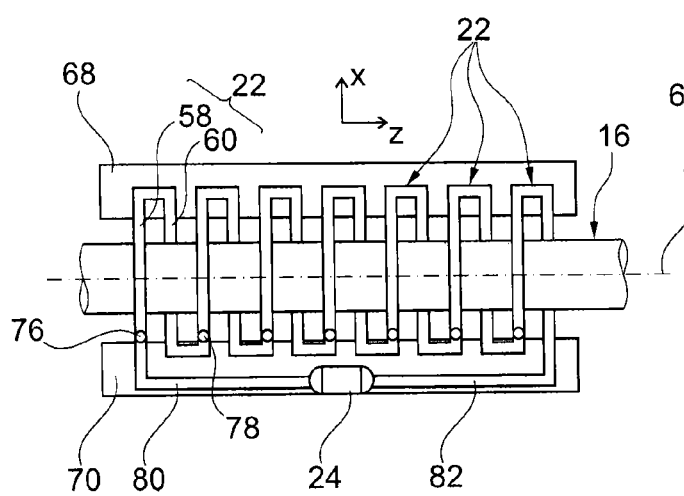
Fig. 4
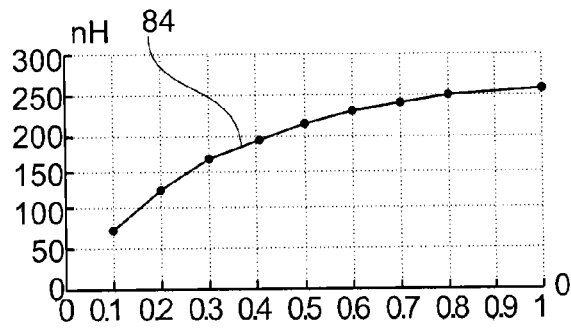
Fig. 5
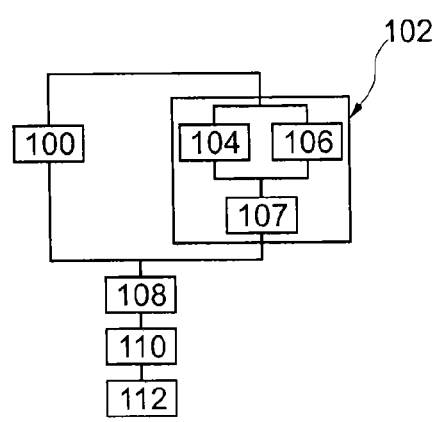
Fig. 6

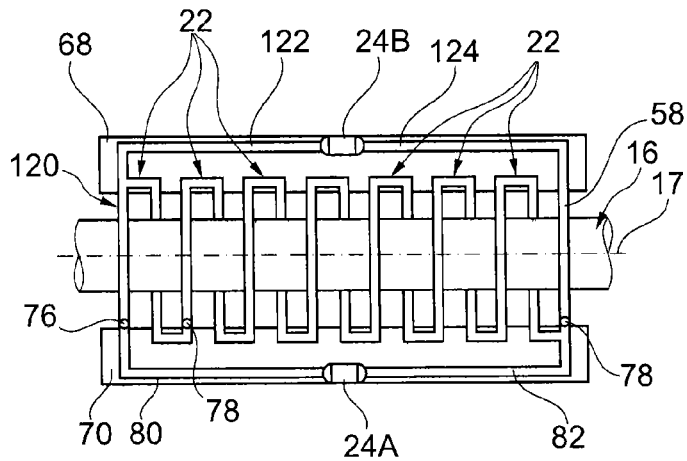
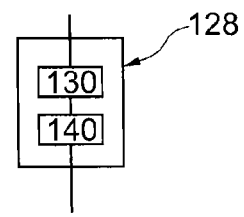
Fig. 7
Fig. 8
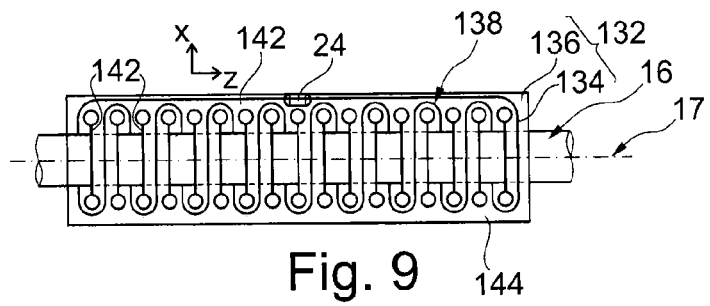
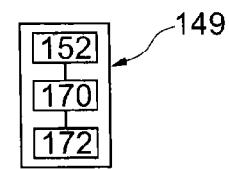
Fig. 9
Fig. 10
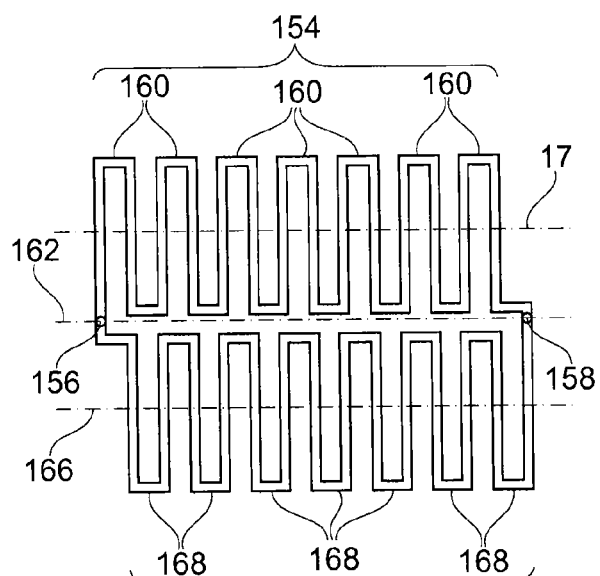
Fig. 11

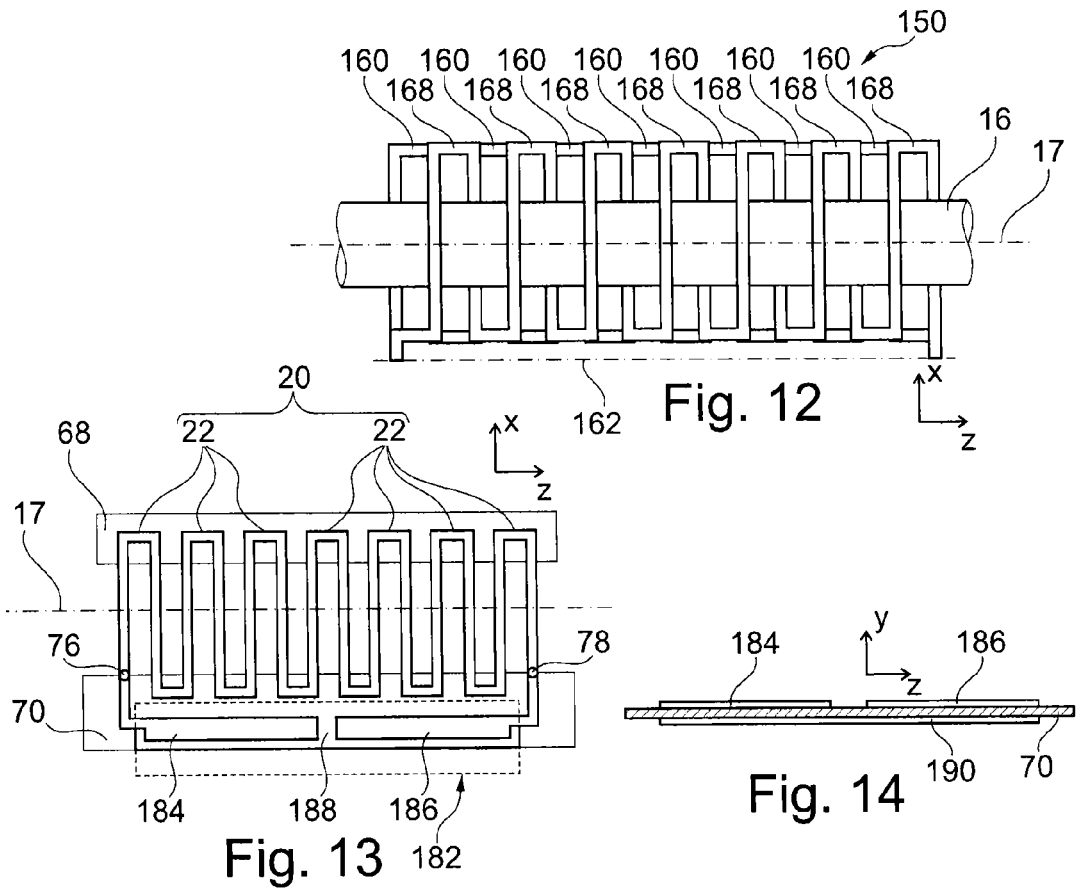
Fig. 12
Fig. 13
Fig. 14
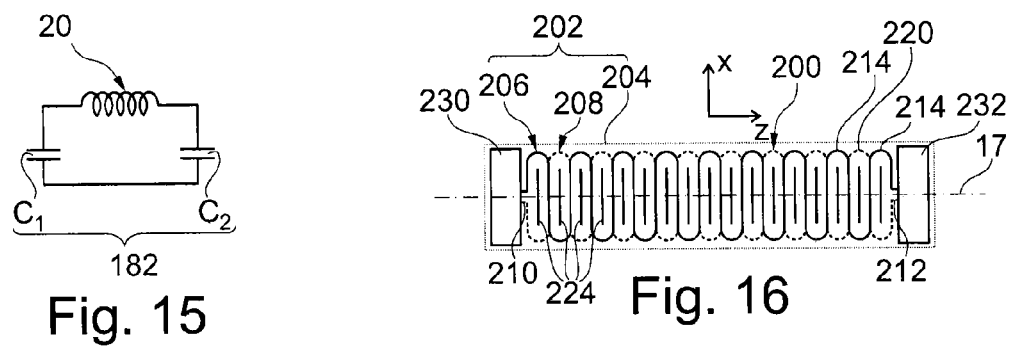
Fig. 15
Fig. 16
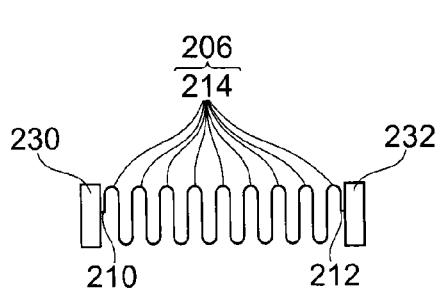
Fig. 17
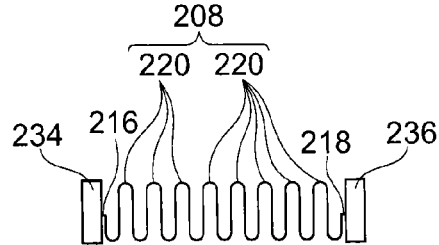
Fig. 18

FLUID PRESSURE SENSOR

FIELD

The invention concerns a fluid pressure sensor and a method of manufacturing this sensor.

By "pressure sensor" is meant a sensor that measures the difference between the pressure of the fluid and a reference pressure. This reference pressure may be zero.

BACKGROUND

There exist a great number of situations in which the pressure of a fluid circulating inside a conduit must be measured without interrupting the circulation of this fluid. One example of such a sensor is described in the international application WO9956614 in the very specific case where the flexible pipe is a vein or an artery.

This known sensor notably includes:

a flexible pipe extending around and along a central axis, this pipe being adapted to contain the fluid the pressure of which must be measured and to be deformed by the effect of the pressure exerted by the fluid, between:
  a first deformed position for a first pressure exerted by the fluid, the pipe having in this first position different first and second locations on its periphery the orthogonal projections of which in a plane perpendicular to the central axis are separated by a distance $d_1$, and
  a second deformed position for a second pressure exerted by the fluid higher than the first pressure, in the second position the orthogonal projections of the first and second locations in the plane perpendicular to the central axis are separated by a distance $d_2$, the difference between the distances $d_2$ and $d_1$ being at least greater than 0.1 $d_2$,
a coil the self inductance of which varies as a function of the pressure of the fluid inside the flexible pipe, this coil including at least one turn wound around a winding axis of the coil,
a unit for calculating the pressure of the fluid as a function of the self inductance of the coil.

To be more precise, in this known sensor, a magnetic core fixed to one side of the flexible pipe is used to vary the self inductance of the coil. This magnetic core moves at the same time as the flexible pipe is deformed because of the effect of the pressure of the fluid. It is the movement of this magnetic core relative to the coil that varies the self inductance of the coil and therefore makes it possible to measure the pressure of the fluid inside the flexible pipe. To this end, the winding axis of the coil is parallel to the direction of movement of the magnetic core and therefore perpendicular to the central axis of the flexible pipe. In this known sensor, the coil is rigid and rigidly fixed to the inside of a shell which is itself rigid.

In a relatively similar manner JPH03-131733A and DE102005016812B3 disclose a pressure sensor in which the magnetic core surrounds the flexible pipe. It is then the deformation of the magnetic core by the flexible pipe that causes a variation in the inductance of the coil.

Prior art is also known from U.S. Pat. No. 3,731,184A. In that document the deformation of the flexible pipe varies the area of the cross section of the coil and therefore its self inductance. To this end, the turns of the coil are each formed of a serpentine conductive wire. The manufacture of such a coil is complex.

This known sensor functions correctly. Nevertheless, it is desirable to simplify it to make it simpler to manufacture.

SUMMARY

The invention aims to solve this problem. Its subject matter is therefore a sensor according to claim 1. By placing the winding axis of the turn parallel to the central axis of the flexible pipe and connecting two distinct portions of its periphery to two different locations on the flexible pipe, deformation of the flexible pipe leads to a modification of the transverse area of the turn. This modification of the transverse area of the turn causes a variation of the self inductance of the coil. This variation of the self inductance of the coil is therefore obtained without using a magnetic core moved by the flexible pipe, which simplifies the manufacture of the sensor. Moreover, the absence of a magnetic core makes it possible to extend the field of use of the part of the sensor fastened to the flexible pipe. This part is compatible with medical MRI (Magnetic Resonance Imaging), for example.

Moreover, providing a clearance between a portion of the interior periphery of each turn and the exterior periphery of the flexible pipe makes it possible to have the transverse area of the turns changing according to the flexible pipe deformation and, at the same time, to preserve a constant perimeter for each turn. This simplifies the manufacture of the coil. Indeed, it is possible for the turns to simultaneously have a form which is simple to manufacture and to use a conductive wire for the turns that is much less elastic than the material of the flexible pipe. It should be emphasized that, contrary to the state of the art, it is no more necessary to have the wire of the turns to form a serpentine so that expansion of the flexible pipe does not rupture the turns of the coil.

The embodiments of this sensor may include one or more of the features of the dependent claims.

These embodiments of the sensor furthermore have the following advantages:

using a conductive material wire wound around two reinforcements and the flexible pipe makes it possible to simplify the manufacture of the sensor and notably the insertion of the flexible pipe inside the turns;

placing the coil alongside the flexible pipe facilitates the manufacture of this sensor because it is then unnecessary to insert the flexible pipe inside the turns;

similarly, placing the coil entirely inside the flexible pipe makes it possible to reduce the overall size of the sensor;

forming each turn with the aid of an upper segment and a lower segment that join at the level of a plane edge makes it possible to manufacture these turns flat, which simplifies the manufacture of the sensor;

manufacturing the turns and the capacitor from the same printed circuit facilitates the manufacture of the sensor;

using a reinforcement improves the maintaining of the separation of the turns of the coil along its winding axis and contributes to making the pressure measurement reliable;

using a turn pitch less than one twentieth of the interior perimeter of this turn makes it possible to reduce the longitudinal area of the coil without reducing the amplitude of the variations of the area of the turns, which increases the accuracy of the pressure measurement, when the turn is wound around the pipe, placing the portions of the turn fixed to the pipe on either side of its winding axis increases the deformation of the turn and therefore the accuracy of the measurement.

The invention also has for subject matter a method of manufacturing the claimed pressure sensor.

The manufacturing method may include the features of the dependent method claim.

These embodiments of the method of manufacture moreover have the following advantages:

producing the coil from an electrical track zig-zagging in a plane around the winding axis simplifies the manufacture of this coil and makes it possible to avoid having to wind a conductive wire around this winding axis.

BRIEF DESCRIPTION OF THE DRAWINGS

The invention will be better understood after reading the following description given by way of nonlimiting example only and with reference to the drawings, in which:

FIG. 1 is a diagrammatic illustration, partly in vertical section, of a pressure sensor;

FIGS. 2 and 3 are diagrammatic illustrations, in cross section, of one turn of the sensor from FIG. 1 in two extreme positions;

FIG. 4 is a diagrammatic illustration, in plan view, of a first embodiment of a coil of the sensor from FIG. 1;

FIG. 5 is a graph representing the evolution of the self inductance of the coil of the sensor from FIG. 1 as a function of the deformation of a flexible pipe of this same sensor;

FIG. 6 is a flowchart of a method of manufacturing the sensor from FIG. 1;

FIG. 7 is a diagrammatic illustration, in plan view, of a second embodiment of a coil of the sensor from FIG. 1;

FIG. 8 is a flowchart of another method of manufacturing a coil;

FIG. 9 is a diagrammatic illustration, in plan view, of the coil produced by the method from FIG. 8;

FIG. 10 is a flowchart of another method of manufacturing a coil;

FIGS. 11 and 12 are diagrammatic illustrations of different manufacturing steps of the method from FIG. 10;

FIG. 13 is a diagrammatic illustration, in plan view, of a first embodiment of a capacitor connected to the coil of the sensor from FIG. 1;

FIG. 14 is a diagrammatic illustration, in vertical section, of the capacitor from FIG. 13;

FIG. 15 is an electrical circuit diagram corresponding to the assembly represented in FIG. 13;

FIG. 16 is a diagrammatic illustration, in plan view, of a third embodiment of a coil for the sensor from FIG. 1;

FIGS. 17 and 18 are diagrammatic illustrations, respectively in plan view and as seen from below, of the coil from FIG. 16;

In these figures, the same references are used to designate the same elements. In the remainder of this description, features and functions well known to a person skilled in the art are not described in detail.

DETAILED DESCRIPTION

Figure 19:
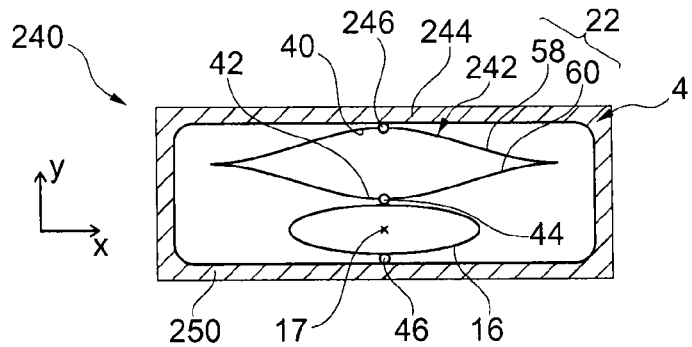
FIGS. 19 and 20 are diagrammatic illustrations, in cross section, of second and third embodiments of a pressure sensor, respectively.

FIG. 1 represents a sensor 2 for sensing the pressure of a fluid circulating inside a conduit 3. This fluid may be a gas or a liquid. The sensor 2 notably includes:

a rigid casing 4, and a measurement and calculation unit 6 connected to the casing 4 by a wireless connection 8 for transmitting information.

Hereinafter by "rigid" is meant an element made from a material the Young's modulus of which is greater than 2 GPa or 3 GPa or 10 GPa or 50 GPa at 25° C.

Here, by way of illustration, the casing 4 has substantially the shape of a parallelepiped. It is disposed between the opposite ends of two parts 3A and 3B of the conduit 3. It is fluidically connected to these two parts 3A and 3B in such a manner as to allow the circulation of the fluid from the part 3A to the part 3B.

To this end, the casing 4 includes two sleeves 12 and 14 each passing through a wall of the casing 4. These sleeves are rigidly fixed to these walls. The sleeves 12 and 14 are preferably situated on opposite walls of the casing 4 and facing each other.

Each sleeve 12, 14 has an outer end that opens to the outside of the casing 4 and an inner end that opens to the inside of the casing 4. The part 3A of the conduit 3 is fluidically connected directly and in a fluid-tight manner to the exterior end of the sleeve 12. For example, one end of the part 3A is a force fit over the exterior end of the sleeve 12.

The part 3B of the conduit 3 is fluidically connected directly to the exterior end of the sleeve 14 in the same way.

The interior ends of the sleeves 12 and 14 are fluidically connected to each other by a flexible pipe 16 that extends along a rectilinear central axis 17 and surrounds this axis 17. Here the axis 17 is horizontal. Each end of the pipe 16 is fluidically connected in a fluid-tight manner to a respective interior end of the sleeves 12 and 14. Between these two ends the pipe 16 includes a deformable central part 18.

The pipe 16 is referred to as "flexible" because its central part 18 is elastically deformable because of the effect of the pressure of the fluid that passes through it between a position $P_1$ and a position $P_2$. For example, the pipe may deform by flexing of a portion of its circumference bearing on two generatrices and/or by elastic distension of its wall. Here the position $P_1$ corresponding to the situation where the pipe 16 is empty and does not contain fluid. In the position $P_1$ the area of the cross section of the central part 18 is denoted $S_1$. Conversely, the position $P_2$ corresponding to the situation where the pipe 16 is filled with a fluid that exerts a maximum pressure on the pipe. In the position $P_2$, the area of the same cross section of the central part 18 is denoted $S_2$. Due to the deformations of the pipe 16 caused by the pressure of the fluid, the area $S_2$ is strictly greater than the area $S_1$. In this embodiment the area $S_1$ is zero or very small compared to the area $S_2$. The pipe 16 is considered as being flexible because the difference between the areas $S_2$ and $S_1$ is greater than at least 0.2 $S_2$ and preferably greater than $S_2$ or 2 $S_2$. To this end, the pipe 16 is produced with a thin wall and/or from a flexible material. By "thin wall" is meant that the thickness of the wall of the part 18 of the pipe 16 is ten times and preferably twenty or thirty times less than the perimeter of this pipe. By flexible material is meant a material the Young's modulus of which is strictly less than 1 GPa or 0.5 GPa at 25° C. For example, the flexible material is an elastomer such as rubber or silicone or some other polymer having elastic properties.

The casing 4 also contains a coil 20 formed of a plurality of turns 22 each wound around the same winding axis. In this embodiment the winding axis of the coil 20 coincides with the axis 17 and each turn is wound around the central part 18 of the pipe 16. Here the turns 22 are all identical to each other and only one turn 22 is described in more detail hereinafter.

The ends of the coil 20 are electrically connected to a capacitor 24 to form with this capacitor 24 an LC resonant circuit. The capacitance of the capacitor 24 is constant and known and so any variation in the oscillation frequency of the LC resonant circuit is mainly caused by a variation of the value of the self inductance L of the coil 20. The resonant frequency of the LC circuit is therefore representative of the value of the self inductance L and therefore of the pressure exerted by the fluid.

In a preferred embodiment the capacitor 24 is the capacitor of an integrated circuit which, in combination with the coil 20, forms an RFID (Radio Frequency Identification) tag 26. In this case the coil 20 constitutes the antenna of this tag 26 through which the LC circuit receives electrical energy and transmits information by modulating the electromagnetic field radiated by the coil 20. This information may be data identifying the part of the sensor enclosed in the casing 4 or parameter data adapted to contribute to the calculation of the pressure by the unit 6 based on the value of the resonant frequency of the resonant circuit. For example, the integrated circuit may carry a temperature sensor and transmit temperature information for applying corrections in the calculation of the pressure as a function of temperature by the unit 6.

The unit 6 is programmed to calculate the pressure of the fluid inside the pipe 16 on the basis of the value of the resonant frequency of the resonant circuit formed by the coil 20 and the capacitor 24. For example, during a calibration phase, a chart connecting the resonant frequencies of the LC resonant circuit to fluid pressures is constructed. Thereafter, during use of the sensor 2, this chart is used to convert each measured resonant frequency into a measured pressure. The unit 6 is for example produced as described in the application WO9956614. It is therefore not described in more detail.

In this embodiment, the casing 4 is not airtight and so the pressure inside the casing 4 is equal to atmospheric pressure. Consequently, the pressure measured by the sensor 2 corresponding to the difference between the pressure of the fluid and atmospheric pressure.

The unit 6 typically forms part of a terminal 28 that uses the measured pressure to control an electronic device such as a display or other device. Here, to simplify FIG. 1, this terminal 28 is represented as forming part of the sensor 2. This is not necessarily the case, however. For example, the unit 6 is not integrated into such a terminal 28 but connected to the terminal 28 by a connection for transmitting information. In this latter case, the terminal 28 does not generally form part of the sensor 2.

FIG. 2 represents in more detail a turn 22 of the coil 20 wound around the central part 18 of the pipe 16 when this pipe 16 is in its position $P_2$. It is assumed here that in the position $P_2$ the cross section of the pipe 16 is circular and centred on the axis 17. In this and the subsequent figures the direction X is the horizontal direction perpendicular to the axis 17 and the direction Y is the vertical direction. Terms such as "upper", "lower", "top", "bottom", "above", "below" and the like are defined relative to the direction Y.

The turn 22 is formed by an electrical track that executes exactly one complete turn around the axis 17. This track is made from a material that is a good conductor, i.e. a material of which the resistivity at 20° C. is less than $10^{-3}$ Ω·m or $10^{-5}$ Ω·m or $10^{-7}$ Ω·m. This is generally a metal. For example, the turn 22 is made of copper.

Metals are very rigid, i.e. they generally have a Young's modulus at 25° C. greater than 10 GPa or 50 GPa or even 100 GPa. The turn 22 is therefore much more rigid than the pipe 16. In this embodiment the turn 22 is therefore adapted to deform by flexing. To prevent the deformations of the flexible pipe 16 generating too high a tension stress in the turn 22, this turn 22 includes to this end only an upper portion 40 and a lower portion 42 each rigidly fixed directly to locations 44 and 46, respectively, on the exterior periphery of the pipe 16. The portions 40, 42 are fixed at the locations 44, 46 by mechanical connections. In this embodiment, the locations 44 and 46 are areas of the periphery of the pipe 16 that bear mechanically on the portions 40 and 42, respectively, of the turn 22. Here a location 44, 46 is considered to bear mechanically on a respective portion of the turn 22 if the mechanical connection between this location and this respective portion of the turn is effected without passing through another portion of the pipe 16. Here each turn 22 bears on respective locations 44, 46 of the pipe 16. The various locations 44 and 46 of each turn are typically aligned on axes parallel to the axis 17.

Hereinafter the distance that separate the orthogonal projections of the locations 44 and 46 in a transverse plane perpendicular to the axis 17 when the pipe 16 is in the position $P_1$ is denoted $d_1$. The distance that separates the orthogonal projections of these same locations 44 and 46 in this same transverse plane when the pipe 16 is in its position $P_2$ is denoted $d_2$. The locations 44 and 46 are chosen so that the difference between the distances $d_2$ and $d_1$ is greater than at least 0.1 $d_2$ and preferably greater than 0.4 $d_2$ or 0.6 $d_2$. Here, to this end, the locations 44 and 46 are situated on diametrically opposite sides of the pipe 16. In FIG. 2 the locations 44 and 46 are respectively situated at the top and at the bottom of the central part 18. In this FIG. 2 the locations 44 and 46 are represented by dots. However, these locations 44 and 46 are not necessarily dots. In this case, the distance between the orthogonal projections of the locations 44 and 46 is measured between the barycentres of each of the orthogonal projections of these locations on the transverse plane. The barycentre of the orthogonal projection is calculated by assigning the same weighting coefficient to each point of this projection. Here the locations 44 and 46 extend the entire length of the portions 40 and 42, respectively, of the periphery of the turn 22. The length of the portions 40 and 42 is typically less than ¼ or ⅕ or ¹/₁₀ of the total interior perimeter of the turn 22.

Here each mechanical connection between a portion 40, 42 and a location 44, 46 is a spot of glue, for example. Thanks to this, when the section of the pipe 16 is deformed, the turn 22 is also deformed, which modifies its transverse area, and therefore the self inductance L of the coil 20.

Between the portions 40 and 42 the turn 22 includes two free portions 48 and 50 each disposed on a respective side of a vertical plane passing through the axis 17. The portions 48 and 50 are separated from the exterior periphery of the pipe 16 by respective clearances 52 and 54. Here these clearances are empty spaces with no solid material situated between the exterior periphery of the pipe 16 and each of the portions 48 and 50.

These clearances 52, 54 allow the turn 22 to deform by flexing and make it possible to limit the size of the portions 40, 42 and therefore to transmit to the turn 22 only the movements of the locations 44 and 46 of the pipe 16. These clearances 52, 54 also make it possible to prevent the mechanical stresses on the wall of the pipe causing traction or compression forces on the material of the turn 22. For example, the pipe 16 may expand when it is deformed from the position $P_1$ to the position $P_2$ so that the perimeter of its cross section is longer in the position $P_2$ than in the position $P_1$. Because of the presence of the clearances 52 and 54, this increase in the perimeter of the cross section of the pipe 16 does not create any additional traction or compression stress in the turn 22, which prevents non-linear measurements or premature rupture of the turn 22. For example, the greatest width of the clearances 52 and 54 in the direction X is greater than one twentieth or one tenth or one fifth of the interior perimeter of the turn 22.

In this embodiment, each turn is formed by an upper segment 58 and a lower segment 60. These segments 58, 60 join at a plane edge 62 that lies in a horizontal plane XZ containing the axis 17. Hereinafter the direction Z is the horizontal direction parallel to the axis 17.

The segment 58 is entirely situated above this plane XZ. The segment 60 is entirely situated below this same plane. In the position $P_2$ the angle between the orthogonal projections of the segments 58 and 60 in a vertical plane perpendicular to the axis 17 at the edge 62 is less than 120°, for example, and preferably, less than 90° or 45°.

All the segments 58 and 60 are the same length in this embodiment.

On the opposite side of the axis 17 the junction between the upper and lower segments of two consecutive turns also forms a plane edge 64 contained in the same plane XZ. Apart from an offset in the direction Z, the edge 64 is typically identical to the edge 62.

Here the edges 62 are all rigidly fixed to a rigid reinforcement 68. This reinforcement is made from an electrically insulative material, i.e. a material the resistivity of which at 20° C. is for example greater than $10^2$ Ω·m or $10^5$ Ω·m or $10^{15}$ Ω·m. The reinforcement 68 takes the form of a rigid rectilinear rod extending parallel to the axis 17. This reinforcement 68 makes it possible to maintain the separation between the segments 58, 60 of a turn and the separation between the turns 22 in the direction Z.

In a similar manner, the edges 64 of all the turns 22 are rigidly fixed to the same reinforcement 70. For example the reinforcement 70 is identical to the reinforcement 68. It is disposed relative to the reinforcement 68 in such a manner that the reinforcements 68 and 70 are symmetrical with respect to each other about a vertical plane passing through the axis 17.

FIG. 3 represents the turn 22 when the pipe 16 is in its position $P_1$. Here, in the position $P_1$ the central part 18 is completely crushed and flat. In this position $P_1$ the locations 44, 46 are much closer to each other than in the position $P_2$. This is reflected in an area of the turn 22 that is much smaller than the area of this same turn in the position $P_2$. Comparing FIGS. 2 and 3, it is also clear that in this embodiment each segment 58, 60 is flexes between its ends anchored at the level of the edges 62, 64.

FIG. 4 represents in more detail a plurality of turns 22 of the coil 20. As shown in this figure, the pipe 16 passes alternately over a lower segment 60 and then under an upper segment 58 of the successive turns of the coil 20. To be more precise, each turn 22 begins at a starting point 76 and ends at an arrival point 78 offset in the direction Z relative to its starting point 76. The starting and arrival points of each turn 22 are all situated in the horizontal plane XZ containing the axis 17. The arrival point 78 of a preceding turn 22 also constitutes the starting point 76 of the immediately consecutive turn 22 in the direction Z. Here the pitch of a turn is defined as being equal to the distance between the orthogonal projections of the points 76 and 78 of the same turn on the axis 17. This pitch is chosen to be less than one twentieth or one fortieth of the interior perimeter of this turn 22.

Thanks to this choice, the turns 22 are pressed together which makes it possible to increase the accuracy of the measurement of the pressure.

The number of turns 22 is typically greater than five or ten and generally less than one hundred.

The sensor 2 also includes:

a conductor 80 electrically connecting the starting point 76 of the first turn 22 to one electrode of the capacitor 24, and a conductor 82 electrically connecting the arrival point 78 of the last turn 22 to the other electrode of the capacitor 24.

These conductors 80 and 82 are rigidly fixed over their entire length to the reinforcement 70. The capacitor 24 is preferably also rigidly fixed to the reinforcement 70.

The sensor 2 functions as follows. When the pressure of the fluid increases the pipe 16 is deformed from its position $P_1$ toward its position $P_2$. This deformation causes the area of the cross section of the turns 22 of the coil 20 to vary. This modification of the area of the cross section of the turns 22 causes the value of the self inductance L of the coil 20 to vary. In parallel with this, the unit 6 produces a primary electromagnetic signal with controlled waveform and centre frequency. This electromagnetic signal induces electrical activity in the LC resonant circuit. This electrical activity produces a secondary electromagnetic signal generated by the coil 20. This secondary electromagnetic signal is received and analyzed by the unit 6. For example, this unit 6 determines the resonant frequency of the LC circuit from the relationship between the primary and secondary electromagnetic signals. The unit 6 then calculates the measured pressure on the basis of this measurement of the resonant frequency. To this end it uses, for example, the chart stored during a calibration phase.

Digital simulations have made it possible to verify that the value of the inductance L of the coil 20 varies greatly and continuously when the pipe 16 is deformed from its position $P_1$ to its position $P_2$. These simulations therefore validate the functioning of the sensor 2. FIG. 5 represents the evolution of the value of the self inductance L as a function of the value of the aperture a/b of the pipe. To this end it is assumed that the cross section of the pipe 16 assumes the form of an ellipse of constant perimeter when it deformed between its positions $P_1$ and $P_2$. The aperture a/b is equal to the ratio of the length "a" of the minor axis of this ellipse to the length "b" of the major axis of this same ellipse.

The FIG. 5 graph was obtained under the following conditions:

the aperture is equal to 0.1 in the position $P_1$ and to 1 in position $P_2$, the number of turns 22 is equal to 17, and the interior perimeter of each turn 22 is equal to 17 mm.

Under these conditions, when the pipe is in its position $P_1$ the value of the self inductance L is approximately equal to 55 nH. When the pipe 16 is in its position $P_2$ the value of the self inductance of the coil 20 is approximately 256 nH. Between the positions $P_1$ and $P_2$ the value of the inductance is therefore multiplied by more than four.

FIG. 6 represents a method of manufacturing the sensor 2.

During a step 100, the pipe 16 is manufactured and then procured.

In parallel with this, during a step 102, the coil 20 is produced. This step 102 begins with an operation 104 of producing an electrical track extending continuously in a plane from the starting point 76 of the first turn 22 to the arrival point 78 of the last turn 22 of the coil 20. This electrical track zig-zags either side of the axis 17. At this stage, the horizontal plane containing this electrical track also contains the axis 17. Each zig-zag of the electrical track forms a lower segment and an upper segment placed end-to-end. The lower and upper segments of each turn are situated in the same horizontal plane. Here each of these segments is perpendicular to the axis 17 and the axis 17 intersects each upper and lower segment at its middle point. During this step, the connecting conductors 80, 82 of the capacitor 24 are also manufactured.

In parallel with this, during an operation 106, notches are produced between each pair comprising a lower segment 60 and an upper segment 58. Each of these notches intersects the axis 17. The length of these notches is sufficient to allow the pipe 16 to pass inside each of these notches.

For example, the operations 104 and 106 are carried out simultaneously by cutting into sheet metal the orthogonal projection on this sheet of the coil 20 from FIG. 4. In this case, the sheet metal typically has a thickness greater than 0.05 mm or 0.1 mm and generally less than 0.5 mm or 0.3 mm.

Then, during an operation 107, the reinforcements 68 and 78 are manufactured and then stuck to the edges 62 and 64 of the turns 22.

After the step 102, all the segments of the turns of the coil 20 are situated in the same horizontal plane.

Then, during a step 108, the pipe 16 is inserted in each of the notches so as to pass above each lower segment 60 and below each upper segment 58. For example, the coil 20 is prepared:

by applying opposite stresses to the reinforcements 68 and 70 to cause them to move toward each other in the direction X, and, simultaneously, two combs separate the segments of each turn 22 along the axis Y, the lower segments toward negative values of y, the upper segments according to positive values of y.

The combs may then be removed while maintaining the opposite stresses on the reinforcements so as to hold the coil 20 open; it is then easy to slide in the pipe 16. Once the pipe is in place the opposite stresses on the reinforcements are removed.

The presence of the pipe 16 between the upper and lower segments deforms these segments which now are each situated on a respective side of the horizontal plane containing the axis 17. If necessary, during the step 108, the portions 40, 42 of each turn 22 are glued to the locations 44 and 46, respectively. Following the step 108, the coil 20 as described with reference to FIGS. 1 to 3 is obtained. It will be noted that the method described makes it possible to avoid having to wind a conductive wire around the pipe 16.

After the step 108, during a step 110, the resulting assembly comprising the pipe 16 and the coil 20 is then mounted inside the casing 4 as described with reference to FIG. 1.

Finally, during a step 112, the terminal 28 equipped with the unit 6 is procured and combined with the casing 4 to produce the sensor 2.

FIG. 7 represents an assembly including a coil 120 mounted around the pipe 16. The coil 120 is identical to the coil 20 except that:

an additional upper segment 58 has been added after the lower segment of the last turn 22 of the coil 20 so that this coil 120 begins and ends with upper segments, and two additional conductors 122 and 124 symmetrical with respect to the conductors 80 and 82, respectively, have been added on the reinforcement 68.

The presence of the conductors 122 and 124 makes it possible to render the mechanical strength of the coil 120 symmetrical and thus to improve its robustness. Here the capacitor 24 is also replaced by two capacitors 24A and 24B connected between the conductors 80, 82 and 122, 124, respectively.

FIG. 8 represents a step 128 of producing a coil. This step 128 is adapted to replace the step 102 of the method from FIG. 6. This step 128 is described with the aid of FIG. 9.

The step 128 begins with an operation 130 of procuring a flexible printed circuit 132 and etching an electrical track 134 in the upper metallization layer of this printed circuit 132. This printed circuit 132 notably includes an electrically insulative flexible substrate 136 onto which the upper metallization layer is deposited. The substrate 136 is made of polyimide, for example.

The track 134 is arranged in a similar manner to what has been described with reference to the step 104 of the method from FIG. 6. In particular, it zig-zags on either side of the axis 17 to form an alternation of upper and lower segments in the direction Z of a coil 138. The track 134 also forms conductors that electrically connect each end of the coil 138 to the capacitor 24. The capacitor 24 is mounted directly on the substrate 136, for example.

During an operation 140, notches 142 passing completely and vertically through the substrate 136 are cut into this substrate 136 between each pair of upper and lower segments to allow the insertion of the pipe 16 along the axis 17. Here these notches 142 are rectilinear cut-outs perpendicular to the axis 17. Circular holes are preferably produced at the ends of each notch 142 to reduce the risk of the substrate 136 tearing. Each notch 142 is also shorter than the upper and lower segments it lies between. On each side of the axis 17, beyond the ends of these notches 142, there is therefore a strip of the substrate 136 that is not cut by these notches. These strips extend continuously parallel to the axis 17. These uncut strips each form a reinforcement 142, 144 that has the same function as the reinforcements 68 and 70.

The step 128 terminates after the operation 140. After that the steps of manufacturing the pressure sensor are the same as described with reference to the method from FIG. 6.

FIG. 10 represents a step 149 adapted to replace the step 102. This variant makes it possible to manufacture a coil 150 (FIG. 12) having a greater number of turns whilst preserving the same overall size.

During an operation 152, an electrical track 154 is produced in a horizontal plane (FIG. 11). The track 154 zig-zags on either side of the axis 17 from a starting point 156 to an arrival point 158 to form a first set of turns 160. Here these turns are geometrically identical to the turns 22, for example. The points 156 and 158 are situated on a bending line 162 parallel to the axis 17 and at a non-zero distance from this axis 17.

During this operation 152, there is also produced in the same horizontal plane an electrical track 164 zig-zagging on either side of an axis 166 from the point 156 to the point 158. The axis 166 is symmetrical with the axis 17 with respect to the bending line 162. The track 164 therefore forms a second set of turns 168. Here the turns 168 are identical to the turns 160. Moreover, they are arranged so that, after bending the pattern formed by the tracks 154 and 164 along the line 162, the lower segments of the turns 168 are superposed on the lower segments of the turns 160. Likewise, after bending, the upper segments of the turns 168 are superposed on the upper segments of the turns 160.

For example, the FIG. 11 pattern is obtained by cutting sheet metal as in the operations 104 and 106 described above.

Then, during an operation 170, an electrically insulative material is introduced to prevent the occurrence of direct electrical short-circuits between the segments of the turns 160 and 168 that are superposed on one another. For example, a layer of insulative varnish is deposited on the upper face of the FIG. 11 pattern.

During an operation 172, the FIG. 11 pattern is bent along the line 162 to obtain the structure represented in FIG. 12. In the coil 150 the upper and lower segments of the turns 168 are superposed on the upper and lower segments, respectively, of the turns 160.

The method of manufacturing the sensor then continues as described with reference to FIG. 6. In particular, during the step 108, the pipe 16 is inserted inside the coil 150, passing systematically over the superposed lower segments and systematically under the superposed upper segments. There is therefore obtained a coil 150 having twice as many turns as the coil 20 while having the same overall size and using the same geometry for each turn.

FIG. 13 represents an assembly including the coil 20 and a capacitor 182 in place of the capacitor 24. The capacitor 182 includes two upper electrodes 184 and 186 situated in a horizontal plane that contains the axis 17 and the edges 62, 64 of the turns 22. The electrode 184 is electrically connected directly to the starting point 76 of the first turn 22. The electrode 186 is electrically connected directly to the arrival point 78 of the last turn 22 of the coil. In this embodiment, the electrodes 184 and 186 are electrically insulated from each other by a gap 188. The electrodes 184 and 186 are preferably manufactured like the conductors 80 and 82 from FIG. 4.

The capacitor 182 also includes, on a face opposite the reinforcement 70, a lower electrode 190 (FIG. 14) made from a material that is a good electrical conductor. The electrode 190 extends continuously under the electrodes 184 and 186. In this embodiment the reinforcement 70 therefore also serves as the dielectric material of the capacitor 182. The combination of the electrodes 184 and 190 forms a capacitor $C_1$. The combination of the electrodes 186 and 190 forms a capacitor $C_2$. Given that the electrode 190 is common to the capacitors $C_1$ and $C_2$, here these capacitors are connected in series, as shown in the FIG. 15 electrical circuit diagram corresponding to the electrical circuit diagram of the assembly from FIG. 13.

FIG. 16 represents a coil 200 before insertion of the pipe 16 inside its turns. The coil 200 is similar to the coil 138 except that this is made from a double-sided flexible printed circuit 202. The printed circuit 202 includes:

a electrically insulative flexible substrate 204 identical to the substrate 136, for example, an upper electrical track 206 produced by etching an upper metallization layer of the printed circuit, and a lower electrical track 208 produced by etching a lower metallization layer of the printed circuit.

In FIG. 16, the track 208 is represented in dashed line because it is situated on the lower face of the substrate 204. FIGS. 17 and 18 show the tracks 206 and 208, respectively, on their own.

The track 206 extends in a horizontal plane along the axis 17 from a starting point 210 to an arrival point 212. This track 206 zig-zags on either side of the axis 17 to form a set of turns 214 along this axis 17. The points 210 and 212 are situated above the axis 17 in the vertical direction and in the same horizontal plane as the track 206. Here the turns 214 are identical to that described with reference to FIG. 9.

The track 208 extends from a starting point 216 to an arrival point 218. The points 216 and 218 are in vertical alignment with the points 210 and 212, respectively, and in the same plane as the track 208. The track 208 forms a set of turns 220 on the lower face of the printed circuit. The track 208 is arranged so that its orthogonal projection in the plane of the track 206 is symmetrical with the track 206 with respect to the orthogonal projection of the axis 17 in this same plane. Under these conditions, in a similar manner to what has been described with reference to FIGS. 10 to 12, the lower segments of the turns 214 and 220 are superposed above one another in the vertical direction. Likewise, the upper segments of the turns 214 and 220 are superposed above one another in the vertical direction.

Notches 224 passing vertically and completely through the substrate 204 are produced between each pair of lower and upper segments of each turn 214, 220. Each notch 224 allows the pipe 16 to pass through it. These notches 224 are identical to the notches 142, for example. It will be noted that the same notch 224 separates both the upper and lower segments of a turn 214 and the upper and lower segments of a turn 220.

The points 210 and 212 are electrically connected to two upper electrodes 230 and 232, respectively. Here these electrodes 230 and 232 are produced by etching the upper metallization layer and are therefore situated in the same horizontal plane as the track 206. Likewise, the points 216 and 218 are electrically connected to two lower electrodes 234 and 236, respectively. These lower electrodes 234 and 236 are produced by etching the lower metallization layer and are therefore situated in the same horizontal plane as the track 208. These electrodes 234 and 236 are in vertical alignment with the electrodes 230 and 232, respectively, and are separated from the latter by the substrate 204. The combination of the electrodes 230 and 234 forms a capacitor $C_1$ and the combination of the electrodes 232 and 236 forms a capacitor $C_2$. The electrical circuit diagram corresponding to the assembly comprising the coil 200 and the capacitors $C_1$ and $C_2$ is therefore structurally the same as that from FIG. 15.

FIG. 19 represents a sensor 240 identical to the sensor 2 except that the coil 20 is replaced by a coil 242. To simplify FIG. 19 only the casing 4 and its content are shown. Moreover, in this figure, only one turn of the coil 242 can be seen.

Here the coil 242 is identical to the coil 20 except that it is fixed between the pipe 16 and an upper stop 244. Hereinafter the same reference numbers as those defined for the coil 20 are therefore used to designate the same elements in the coil 242. Here the stop 244 also forms the upper wall of the casing 4. The portion 40 of each turn 22 of the coil 242 is rigidly fixed directly to the stop 244 at a location 246. The portion 42 is rigidly fixed directly to the location 44 on the pipe 16 and not to the location 46 as in the previous embodiments.

The location 46 on the pipe 16 is rigidly connected mechanically and indirectly to the portion 40 of the turn. To this end, the location 46 is rigidly fixed to a lower stop, here the lower wall 250 of the casing 4, which is itself rigidly mechanically connected to the stop 244 via the vertical walls of this casing. In this embodiment the mechanical connection between the portion 40 of the turn 22 and the location 46 on the pipe therefore includes:

the rigid fixing between the portion 40 and the location 246, the rigid fixing between the location 246 and the wall 250, the stop 244, and the lower wall 250 and the vertical walls of the casing.

The rigid fixing is produced by means of a spot of glue, for example.

The locations 40, 42 and 246 are preferably situated in the same vertical plane passing through the axis 17 to maximize the variation of the transverse area of the turns 22 in response to deformation of the pipe 16.

In this embodiment, the turns 22 are not wound around the pipe 16 and so the step 108 can be omitted during the manufacture of the sensor 240.

The functioning of the sensor 240 is deduced from the functioning of the sensor 2 except that, when the pressure of the fluid decreases, the area of the turns 22 increases and the self inductance of the coil 242 increases. Conversely, when the pressure of the fluid increases, the area of the turns 22 decreases and the value of the self inductance of the coil 242 decreases.

Figure 20:
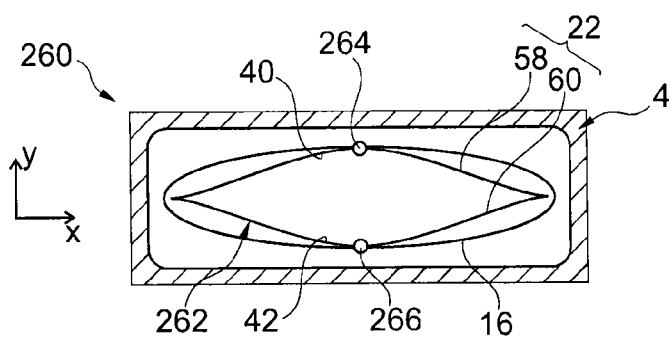

FIG. 20 represents a sensor 260 identical to the sensor 2 except that the coil 20 is replaced by a coil 262. As in the previous figure, for simplicity, only the casing 4 and its content are shown and only one turn of the coil 262 can be seen.

The coil 262 is identical to the coil 20 except that it is situated entirely inside the central part 18 of the pipe 16 and not around this pipe 16. The portion 40 of each turn 22 of the coil 262 is then rigidly fixed directly to a location 264 on the interior face of the pipe 16. The portion 42 of each turn 22 is also rigidly fixed to a location 266 on the interior face of the pipe 16. The locations 264 and 266 are diametrically opposite.

The functioning of the sensor 260 is deduced from the functioning of the sensor 2.

Figure 21:
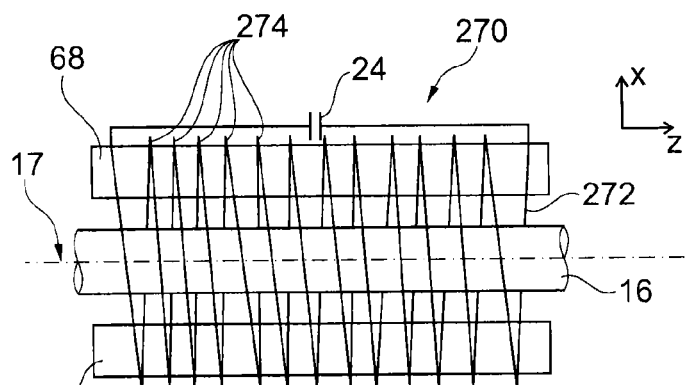
FIGS. 21 and 22 are diagrammatic illustrations, in plan view, of two further embodiments of a coil for the sensor from FIG. 1.

FIG. 21 represents a coil 270 identical to the coil 20 except that the turns 22 are produced by depositing a conductive material wire 272 on the reinforcements 68 and 70. The wire 272 is a copper wire, for example. This wire 272 zig-zags between the reinforcements 68 and 70, advancing in the direction Z to form a set of turns 274.

The wire 272 is deposited on the upper face of each reinforcement 68, 70 and rigidly fixed to this upper face. For example, the edges of the turns 274 are glued to the reinforcements 68 and 70. Between the reinforcements 68, 70 the wire 272 is suspended and free. The reinforcements 68 and 70 extend parallel to the axis 17 and are spaced from each other by a distance sufficiently large to receive the pipe 16. The pipe 16 is then inserted inside the turns 274 as described with reference to the step 108. It is for example the stiffness of the wire 272 that renders negligible the deformation of the turns 274 under their own weight or under the weight of the reinforcements 68 and 78. It is therefore also the stiffness of the wire 272 that maintains a clearance between the reinforcements 68 and 70 in the position $P_1$ of the pipe.

Figure 22:
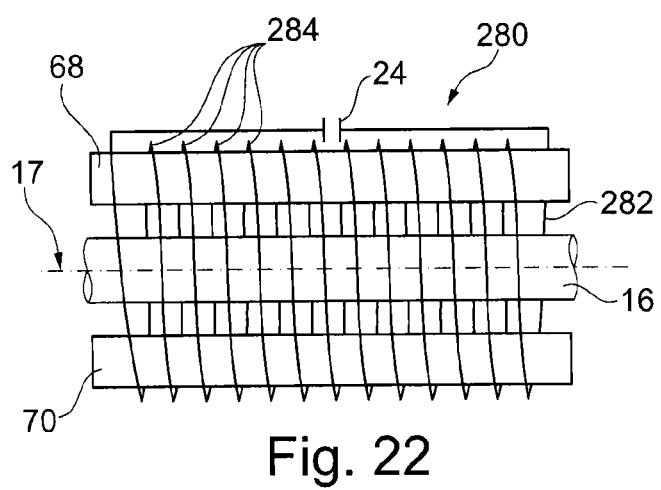

FIG. 22 represents a coil 280 identical to the coil 270 except that the wire 272 is replaced by a wire 282. The wire 282 is identical to the wire 272 except that it is wound around the reinforcements 68 and 70 to form a set of turns 284. In this embodiment the lower segment of each turn 284 is rigidly fixed at each of its ends to a lower face of the reinforcements 68 and 70. Conversely, the upper segment of each turn 284 is rigidly fixed at each of its ends to the upper face of the reinforcements 68 and 70.

In this embodiment the pipe can be inserted inside the turns 284 after the manufacture thereof. However, it is also possible to place the pipe 16 between the reinforcements 68 and 70 before winding the wire 282 around the reinforcements 68, 70 and, at the same time, around the pipe 16. In this latter case, the segments of each turn 284 are fixed at each of their ends to corresponding faces of the reinforcements 68 and 70, for example.

Numerous other embodiments are possible. For example, the pressure sensors described may be used to measure the pressure of a gas circulating inside the pipe 16 or a liquid circulating inside this same pipe. The sensors described above also function if the fluid situated inside the pipe 16 does not circulate, i.e. is stationary. They can also be used to measure a pressure of the fluid lower than the exterior pressure, i.e. lower than the pressure inside the casing 4.

Alternatively, the casing 4 is air-tight and a vacuum is produced inside the casing 4. In this case, the sensor is an absolute pressure sensor.

Alternatively, the lateral reinforcements 68 and 70 may be omitted. It is also possible to omit only one of the reinforcements 68 and 70 and to retain the other one. Alternatively, there may also be provision for using more than two reinforcements.

The self inductance of the coil may be measured differently and in particular without recourse to the formation of an LC resonant circuit. For example, an inductance measuring device electrically connected to each end of the coil may be used. Such a measuring device typically applies an alternating current electrical signal of known frequency in the coil and then the self inductance of this coil is calculated from the imaginary part of the ratio of the voltage at the terminals of the coil to the current circulating between those terminals. The measurement and calculation unit may therefore also be electrically connected to the casing 4 by a connecting wire.

Other embodiments of the measurement and calculation unit 6 are also described in the application WO9956614, for example.

If the flexible pipe is deformed and systemically retains a constant perimeter of its cross section, it is not necessary to provide a clearance between the turns 22 and this pipe. In this case, the clearances 52 and 54 may be omitted. The turns of the coil may then be wound directly onto the pipe without leaving a clearance between these turns and the exterior surface of the pipe. The turns of the coil may also be incorporated entirely inside the walls of the pipe.

In another variant, the conductive wire can stretch and, alternately, shrink elastically in response to the deformations of the pipe. In this case, the clearance between the turns and the pipe may also be omitted. For example, the conductive wire is made from an elastic material. These elastic properties may also be conferred on the wire by curling it. For example, in this latter case, the wire is a spiral wire that is wound on itself to form successive loops in a longitudinal direction in the manner of a spring that extends in this longitudinal direction. The pitch between these loops is ten or twenty times less than the pitch of the turns of the coil. The spiral wire is then used as described with reference to FIGS. 21 and 22, for example. The spiral wire may be replaced with a serpentine wire, i.e. a wire which undulates in a plane on either side of the longitudinal direction. In this case also the period of the undulations in the wire is ten or twenty times less than the pitch of the turns of the coil.

The clearances 52, 54 may be filled with a solid material much more flexible than the material used to make the pipe 16, such as a foam.

The number of turns of the coil may also be as small as one. It may equally be greater than one hundred.

The conduit 3 may be inserted directly inside the coil. In this case, the sleeves 12, 14 are omitted and the pipe 16 is formed by the part of the conduit 3 that is mechanically connected to the turns of the coil.

If the turns of the coil are prestressed to exert a continuous return force on the flexible pipe from its position $P_2$ toward its position $P_1$ then the spots of glue may be omitted. In fact, in this case, the upper and lower segments of each turn are permanently urged against the locations 44 and 46, respectively, on the central part of the flexible pipe, which may be sufficient to fix the portions 40 and 42 rigidly at these respective locations on the pipe. In this case, the mechanical connections between the locations 44, 46 and the portions 40, 42 are made by simply bringing the portions 40, 42 into compressive contact on the corresponding location 44, 46.

The portions 40 and 42 fixed at different locations on the pipe 16 are not necessarily disposed in a diametrically opposite manner relative to the winding axis of the turn. For example, they may also be disposed in a vertical plane at 90° to each other even if this is not the preferred embodiment. In fact, it is sufficient for there to be an angular offset in the vertical plane about the winding axis between the positions of these portions 40 and 42 for the sensor to begin to function. This angular offset is preferably equal to 180° to within plus or minus 90° and preferably to within plus or minus 45° or 20°. The position of a turn portion in the vertical plane corresponds to the position of the barycentre of the orthogonal projection of this turn portion in this vertical plane assigning each point of this projection the same weighting coefficient.

Each portion 40, 42 may be rigidly fixed at a respective location on the pipe 16:
a) either by a direct mechanical connection as in the embodiments of FIGS. 1 and 20,
b) or by an indirect mechanical connection that further comprises a rigid intermediate mechanical part rigidly fixed on one side to the portion of the turn and on another side to the corresponding location on the pipe.

The case b) above is illustrated here by the connection of the portion 40 of the turn 22 to the location 46 in the FIG. 19 embodiment. In the FIG. 19 embodiment the intermediate mechanical part is the casing 4. In one particular embodiment the portions 40 and 42 are both connected by respective indirect mechanical connections to respective locations on the pipe 16.

The number of portions of the turn rigidly fixed to the pipe may be greater than three.

The locations 44, 46 on the pipe 16 at which the portions 40, 42 are fixed are not necessarily situated on diametrically opposite sides relative to the axis 17. For the sensor to begin to function it suffices that there is an angular offset around the axis 17 between the positions of these locations. This angular offset is typically equal to 180° plus or minus 90° and preferably plus or minus 45° or 20°. The position of a location in the vertical plane corresponds to the position of the barycentre of the orthogonal projection of that location in this vertical plane. The barycentre is measured as indicated above.

The shape of the orthogonal projection of the turns of the coils in a horizontal plane may be different from that described above. For example, this orthogonal projection may be pointed at the level of the edge or to the contrary rounded at the level of the edges 62, 64. Nor is it necessary for all the turns of the same coil to be exactly the same shape. For example, the shapes of the turns 22 and the turns 138 are instead mixed in the same coil. However, sufficient space must exist between the lower and upper segments to provide the notch inside which the pipe must be inserted.

Instead of being etched, the electrical tracks may be deposited on an insulative substrate.

It is not necessary for the upper and lower segments of the turns 168 to be superposed exactly on the upper and lower segments of the corresponding turns 160 after bending. In fact it suffices for sufficient space to remain after bending between the upper and lower segments of each turn 160,168 to form the notch inside which the pipe is inserted. For example, there is instead a slight offset between the upper segments of the turns 160 and 168 and the lower segments of the turns 160 and 168 after bending. However, the upper segments of the turns 168 are arranged so that, after folding, they are nearer the upper segments of the turns 160 than the lower segments of the turns 160. The same applies to the arrangement of the lower segments of the turns 168 which, after bending, must be nearer the lower segments of the turns 160 than the upper segments of the turns 160.

The stop 244 or 250 may assume a shape other than that of a solid wall. For example, this stop is instead a rigid rod that extends parallel to the axis 17 and at a constant distance from that axis 17. In all case, these two stops are held at a fixed distance from each other.

In a variant of the sensor 2:
the portions 40, 42 of the turn are rigidly mechanically connected only to the locations 44 and 46, respectively on the pipe, as described above, and
the portion 42 is additionally rigidly fixed directly to the wall 250 of the casing 4.

The invention claimed is:
1. A fluid pressure sensor, comprising:
a flexible pipe extending around and along a central axis of the pipe, being configured to contain a fluid having a pressure to be measured, and to be deformed by an effect of the pressure exerted by the fluid, between:
  a first deformed position for a first pressure exerted by the fluid, in the first deformed position the pipe having on its periphery a first location and a second location, wherein respective orthogonal projections of the first location and the second location in a plane perpendicular to the central axis are separated from each other by a first distance, and
  a second deformed position for a second pressure exerted by the fluid that is higher than the first pressure, wherein in the second deformed position respective orthogonal projections of the first location and the second location in the plane perpendicular to the central axis are separated from each other by a second distance, a difference between the first distance and the second distance being at least greater than 0.1 times the second distance;
a coil having a self-inductance that varies as a function of the pressure exerted by the fluid inside the pipe, the coil including at least one turn wound around a winding axis of the coil coinciding with the central axis, the at least one turn including:
  a first portion of its periphery mechanically connected to the first location on the periphery of the pipe by a first mechanical connection, which rigidly connects the first portion to the first location,
  a second portion of its periphery, separate from the first portion, mechanically connected to the second location on the periphery of the pipe by a second mechanical connection, separate from the first mechanical connection, which rigidly connects the second portion to the second location, so that an area defined by the at least one turn varies as a function of the deformation of the pipe, and
  a third portion and a fourth portion of its periphery situated between the first portion and the second portion, each of the third portion and the fourth portion being on a respective side of the central axis, the third portion and the fourth portion being free portions separated from the pipe by a clearance; and a unit configured to calculate the pressure to be measured as a function of the self-inductance of the coil.

2. The fluid pressure sensor according to claim 1, wherein the at least one turn is wound around the pipe.

3. The fluid pressure sensor according to claim 2, further comprising:

two reinforcements situated between the pipe and the third portion and the fourth portion of each turn, respectively, each reinforcement being produced from an electrically insulative material and extending parallel to the central axis and being separated from the pipe by the clearance; and an electrically conductive material wire wound around the two reinforcements and the pipe to form the at least one turn so that the at least one turn surrounds the two reinforcements and the pipe.

4. The fluid pressure sensor according to claim 1, wherein a maximum width of the clearance in the first position is greater than one-twentieth of an interior perimeter of the at least one turn.

5. The fluid pressure sensor according to claim 1, wherein the at least one turn is situated inside the pipe.

6. The fluid pressure sensor according to claim 1, wherein the at least one turn includes an upper segment situated above the winding axis and a lower segment situated below the winding axis, the upper segment joining the lower segment at a level of a plane edge extending in a plane, all plane edges of all turns of the at least one turn of coil lying in the same plane.

7. The fluid pressure sensor according to claim 6, further comprising a printed circuit comprising:

an electrically insulative substrate disposed substantially in the plane containing the plane edge;

a first electrical track disposed on a first face of the substrate and forming the upper segment and the lower segment of the at least one turn;

a first electrode disposed on the first face; and a second electrode disposed on a second face opposite the first face of the substrate, the second electrode facing the first electrode to form with the first electrode a capacitor electrically connected to the coil.

8. The fluid pressure sensor according to claim 1, further comprising at least one electrically insulative reinforcement having a Young's modulus that is at least twice a Young's modulus of the pipe, the reinforcement extending continuously parallel to the central axis and the at least one turn being rigidly fixed to the reinforcement.

9. The fluid pressure sensor according to claim 1, wherein the coil includes a plurality of immediately consecutive turns each extending from a starting point to an arrival point situated in a same plane after making exactly one complete turn around the winding axis, said plane containing the winding axis, the arrival point of a turn constituting the starting point of an immediately consecutive turn, a pitch of each turn of the plurality being less than one-twentieth of an interior perimeter of said each turn measured between its starting and arrival points, the pitch being a distance between orthogonal projections of the arrival and starting points on the winding axis.

10. The fluid pressure sensor according to claim 1, wherein respective orthogonal projections of the first portion of the at least one turn and of the second portion of the at least one turn in a plane perpendicular to the winding axis are respectively disposed face to face on opposite sides of the winding axis.

11. A method of manufacturing a fluid pressure sensor according to claim 1, the method comprising:

providing a flexible pipe extending around and along a central axis of the pipe, being configured to contain a fluid having a pressure to be measured, and to be deformed by an effect of the pressure exerted by the fluid, between:

a first deformed position for a first pressure exerted by the fluid, in the first deformed position the pipe having on its periphery a first location and a second location, wherein respective orthogonal projections of the first location and the second location in a plane perpendicular to the central axis are separated from each other by a first distance, and a second deformed position for a second pressure exerted by the fluid that is higher than the first pressure, wherein in the second deformed position respective orthogonal projections of the first location and the second location in the plane perpendicular to the central axis are separated from each other by a second distance, a difference between the first distance and the second distance being at least greater than 0.1 times the second distance;

producing a coil having a self-inductance that varies as a function of the pressure exerted by the fluid inside the pipe, the coil including at least one turn wound around a winding axis of the coil coinciding with the central axis, the at least one turn including:

a first portion of its periphery mechanically connected to the first location on the periphery of the pipe by a first mechanical connection, which rigidly connects the first portion to the first location, a second portion of its periphery, separate from the first portion, mechanically connected to the second location on the periphery of the pipe by a second mechanical connection, separate from the first mechanical connection, which rigidly connects the second portion to the second location, so that an area defined by the at least one turn varies as a function of the deformation of the pipe, and a third portion and a fourth portion of its periphery situated between the first portion and the second portion, each of the third portion and the fourth portion being on a respective side of the central axis, the third portion and the fourth portion being free portions separated from the pipe by a clearance; and providing a unit configured to calculate the pressure to be measured as a function of the self-inductance of the coil.

12. The method according to claim 11, wherein the producing the coil comprises:

producing an electrically conductive track lying in a plane containing the winding axis of the coil from a starting point of the coil to an arrival point of the coil, the starting point and the arrival point being contained in the plane, zigzagging on either side of the winding axis, the track defining from the starting point to the arrival point a succession of immediately consecutive and end-to-end segments $B_i$, each segment $B_i$ extending on either side of the winding axis and intersecting the winding axis at only one location, where an index i is a segment order number in the succession of segments starting from the starting point;

producing notches between the consecutive and end-to-end segments $B_i$, each notch intersecting the winding axis and being configured to receive the pipe; and inserting the pipe in the produced notches, along the winding axis, passing over a segment $B_1$ of the succession of immediately consecutive and end-to-end segments $B_i$, then under a segment $B_2$ of the succession of immediately consecutive and end-to-end segments $B_i$, and then over a segment $B_3$ of the succession of immediately consecutive and end-to-end segments $B_i$, and continuing up to a last segment of the succession of immediately consecutive and end-to-end segments $B_i$.

* * * * *